US012612958B2

(12) United States Patent

Neves et al.

(10) Patent No.: US 12,612,958 B2

(45) Date of Patent: Apr. 28, 2026

(54) LINEAR ACTUATOR ASSEMBLY

(71) Applicant: Fathom5 Corporation, Austin, TX (US)

(72) Inventors: Robert Scott Neves, Pflugerville, TX (US); Delbert Tesar, Austin, TX (US)

(73) Assignee: Fathom5 Corporation, Austin, TX (US)

( * ) Notice: Subject to any disclaimer, the term of this patent is extended or adjusted under 35 U.S.C. 154(b) by 0 days.

(21) Appl. No.: 18/438,279

(22) Filed: Feb. 9, 2024

(65) Prior Publication Data

US 2024/0271682 A1      Aug. 15, 2024

Related U.S. Application Data

(60) Provisional application No. 63/444,656, filed on Feb. 10, 2023.

(51) Int. Cl.
| | |
|---|---|
| *F16H 19/04* | (2006.01) |
| *F16H 1/20* | (2006.01) |
| *F16H 35/00* | (2006.01) |
| *F16H 57/00* | (2012.01) |
| *F16H 57/021* | (2012.01) |

(52) U.S. Cl.
CPC ............. *F16H 19/04* (2013.01); *F16H 1/206* (2013.01); *F16H 57/021* (2013.01); *F16H 2035/001* (2013.01); *F16H 57/0025* (2013.01); *F16H 2712/06* (2013.01)

(58) Field of Classification Search
CPC . F16H 19/04; F16H 1/206; F16H 1/20; B66B 11/0461; B66F 3/04; B66F 11/04

USPC ....................... 74/29, 422, 89.17; 254/95, 97
See application file for complete search history.

(56) References Cited

U.S. PATENT DOCUMENTS

| | | | | |
|---|---|---|---|---|
| 4,813,814 A | * | 3/1989 | Shibuta | E02B 17/0818 |
| | | | | 405/196 |
| 7,581,714 B2 | * | 9/2009 | Machu | B66F 3/02 |
| | | | | 254/100 |
| 8,336,388 B2 | * | 12/2012 | Lenders | G01L 3/02 |
| | | | | 73/786 |
| 9,371,897 B2 | * | 6/2016 | Rademakers | F16H 37/082 |
| 9,531,237 B2 | * | 12/2016 | Miller | H02K 7/116 |
| 9,657,813 B2 | * | 5/2017 | Tesar | F16H 57/08 |
| 9,879,760 B2 | | 1/2018 | Tesar | |
| 9,915,319 B2 | | 3/2018 | Tesar | |
| 10,655,706 B2 | | 5/2020 | Tesar | |

(Continued)

OTHER PUBLICATIONS

KHK Co., Ltd., KHK Catalog—Product Guide, Hardened Racks, Part No. KFRD5-1000HJ described at https://khkgears.net/pdf/krf-h krfd-h.pdf, 2021 (1 page).

(Continued)

*Primary Examiner* — Jake Cook
(74) *Attorney, Agent, or Firm* — Baker Botts L.L.P.

(57) ABSTRACT

A linear actuator includes a support structure having a first face, and a second face opposite the first face; a first rack secured to the first face; a second rack secured to the second face; a first compound gear and a second compound gear; and a drive gear engaged with the first input gear on a first side of the drive gear, and engaged with an idle gear on a second side of the drive gear, opposite the first side of the drive gear. The first and second compound gears are configured for a simultaneous linear motion in one of two opposing directions.

19 Claims, 12 Drawing Sheets

(56) References Cited

U.S. PATENT DOCUMENTS

| | | | |
|---|---|---|---|
| 10,724,614 B2 * | 7/2020 | Lundbäck | F16H 19/043 |
| 10,801,586 B2 | 10/2020 | Tesar | |
| 11,022,200 B2 | 6/2021 | Tesar | |
| 2009/0090191 A1 * | 4/2009 | Lenders | E02B 17/0818 |
| | | | 73/786 |
| 2013/0056988 A1 * | 3/2013 | Hunt | F03B 13/186 |
| | | | 290/53 |

OTHER PUBLICATIONS

KHK Co., Ltd., KHK Catalog—Product Guide, Thermal Refined Spur Gears, Part No. KS5-20 available at https://khkgears.net/pdf/ks.pdf, 2021 (1 page).

Electric Motorsport, Inc., ME1616 Brushless 20KW-55KW Liquid Cooled IPM Motor 48-150v, manufactured by Motenergy, Inc, Wisconsin, USA, available at https://www.electricmotorsport.com/me1616-brushless-65hp-liquid-cooled-ipm-motor-24-120v.html, 2016 (1 page).

Stearns A Regal Rexnord Brand, Servo AAB310 series, available at https://www.stearnsbrakes.com/products/motor-brakes/servo/aab-310-series, 2025 (2 pages).

Stearns A Regal Rexnord Brand, Servo AAB311 series, https://www.stearnsbrakes.com/products/motor-brakes/servo/aab-311-series, 2025 (2 pages).

SKF, Deep Groove Ball Bearing 212 (Deep Groove Ball Bearing with Filling Slots), available at https://www.skf.com/id/products/rolling-bearings/bAKall-bearings/deep-groove-ball-bearings/productid-212) (8 pages), 2025.

SKF, Deep Groove Ball Bearing 6010, available at https://www.skf.com/my/products/rolling-bearings/ball-bearings/deep-groove-ball-bearings/productid-6010 (8 pages), 2025.

* cited by examiner

LINEAR ACTUATOR ASSEMBLY

CROSS-REFERENCE TO RELATED APPLICATIONS

The present application claims priority to U.S. Provisional Application No. 63/444,656, filed on Feb. 10, 2023, which is incorporated herein by reference in its entirety.

FIELD OF THE DISCLOSURE

The present disclosure relates generally to mechanical actuators, and more particularly to linear actuators.

BACKGROUND OF THE DISCLOSURE

In contemporary industrial applications, particularly in the military defense industry, there is a discernible demand to transition towards high-load industrial electric actuators as a replacement for problematic hydraulic systems. This necessity is notably illustrated in scenarios within the military industry, where, for example, large elevator platforms must navigate high shock environments, necessitating the capability to raise and lower platforms carrying up to 20,000 lbs. or more, with speeds up to or surpassing 100 feet per minute for extended durations. Similarly, there are additional scenarios requiring the replacement of hydraulic rams with electric linear actuators to generate as much as 18,000 lbs. or more of linear force.

Existing actuators have not been applied to heavy-load platforms efficiently due to having less resilience to shocks. In particular, there are still tilting problems when the platforms perform a linear climbing motion.

There is a need to develop a stable and reliable linear actuator device for applying on these supporting and climbing platforms evenly and resiliently, especially in response to shocks.

SUMMARY OF THE DISCLOSURE

In accordance with a particular embodiment, an actuator assembly includes a support structure having a first face, and a second face opposite the first face. A first rack is secured to the first face, and a second rack secured to the second face. A first compound gear includes a first pinion gear engaged with the first rack, and a first input gear torsionally locked with the first pinion gear. A second compound gear includes a second pinion gear engaged with the second rack, and a second input gear torsionally locked with the second pinion gear. A drive gear is engaged with the first input gear on a first side of the drive gear, and engaged with an idle gear on a second side of the drive gear, opposite the first side of the drive gear. The first and second compound gears are coupled for simultaneous linear motion in one of two opposing directions. The first and second compound gears may be coupled with a platform for selectively carrying loads in one of the two opposing directions.

In accordance with another embodiment, the drive gear of the actuator assembly is configured to directly receive an output of an eccentric gearbox. The eccentric gearbox may be configured to drive a shaft extending into a first housing. The shaft may be configured to be torsionally locked with the drive gear in order to translate rotation of the eccentric gearbox to the drive shaft. In certain embodiments, the first and second input gears, and the idle gear may be enclosed within the first housing.

In accordance with yet another embodiment, a hollow structure is coupled with the first and second compound gears, the idle gear, and the drive gear. The hollow structure may include first and second openings through which the first and second pinion gears engage the first and second racks, respectively.

DETAILED DESCRIPTION

The present disclosure includes, but is not limited to, linear actuators and assemblies thereof which have been applied to a variety of industrial applications, including loading, climbing, and lifting constructions. Such actuators may reduce the cost of these devices, provide redundancy, and enhance resiliency to shocks. Certain embodiments described herein may provide for some or all of the above improvements.

Figure 1A:
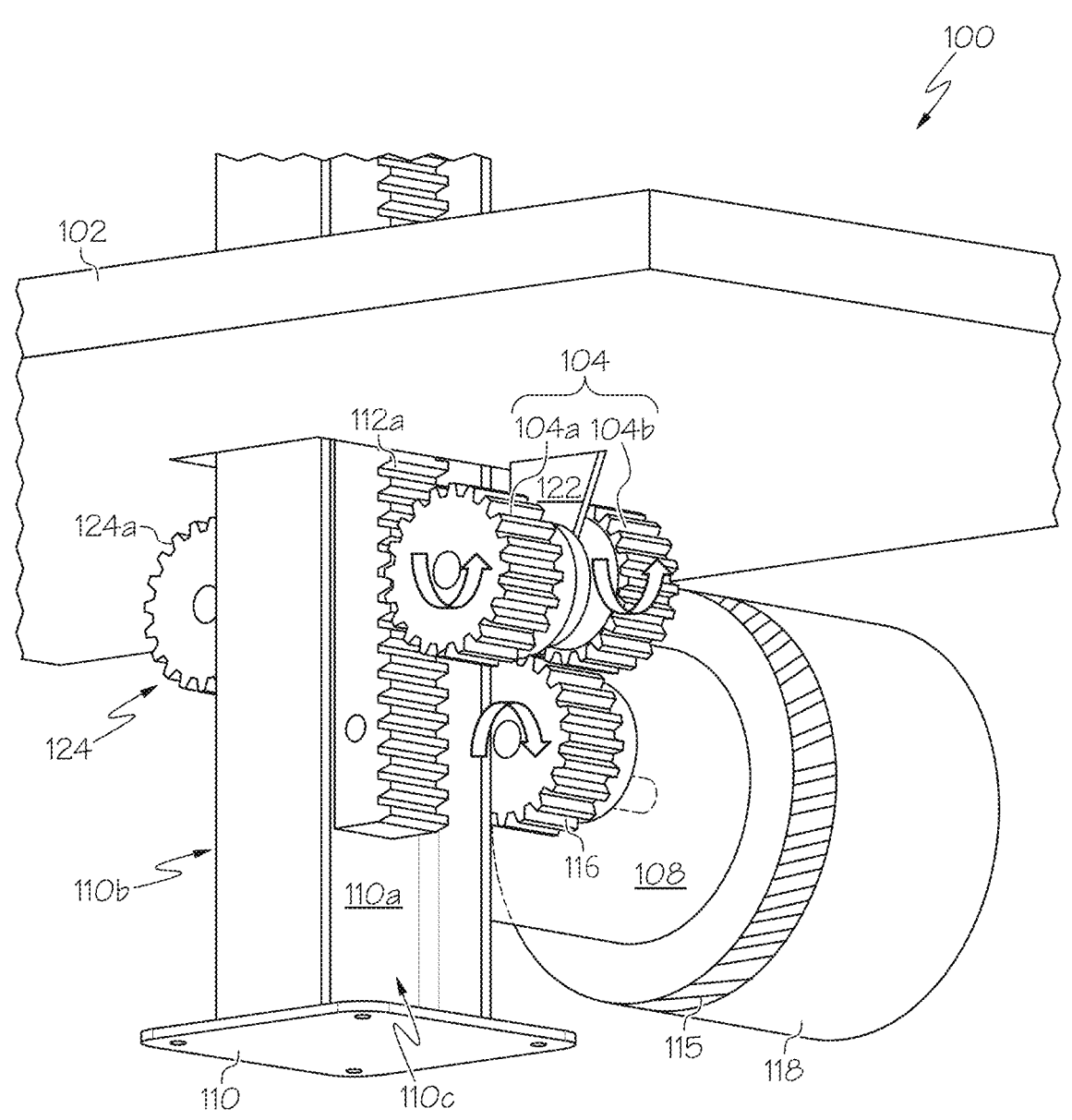
FIG. 1A is an illustration of a linear actuator coupled with a platform, in accordance with a particular embodiment.

FIG. 1A depicts a non-limiting embodiment of a linear actuator coupled with a platform in accordance with a particular embodiment of the disclosure. In subsequent descriptions of these figures, some terms will be referenced frequently, e.g., actuators, racks, pinions, compound gear, idle gear, drive, platform, mesh, beam, volume, and bearings, etc., but one skilled in the art will understand that such terms may be typically expanded to other definitions without a literal limitation to the disclosed embodiments.

With reference to FIG. 1A, a linear actuator 100 depicted therein is coupled with a platform 102, which can be an elevated platform or lift platform. In certain embodiments, the linear actuator 100 may have a supporting structure 110 suitable for supporting the loads of the equipment described herein, and any load carried by the platform 102 when functioning as a vertical lift or elevator. In particular embodiments, the support structure 110 may be an upright I-beam, column or pole with substantial rigidity.

In the illustrated embodiment, the linear actuator 100 is coupled with the platform 102 via a fixation between compound gears 104 and 124 and platform 102. Only a portion of compound gear 124 is illustrated in FIG. 1A, and the coupling between compound gear 124 and platform 102 is not shown. However, compound gear 124 is identical to compound gear 104, and the connection between compound gear 124 and platform 102 is identical to the connection between compound gear 104 and platform 102. Additional details regarding compound gear 124 is illustrated in FIG. 1D and FIG. 1H.

For example, in alternative embodiments, the fixation between the platform and each of the compound gears can utilize an arm of a bracket 122 being installed on the underside of the platform 102, and a triangle plate of the bracket 122 being mounted on the compound gears 104, 124. Alternatively, the linear actuator 100 can be engaged with the platform 102 via a locking interaction between bearings and bearing blocks, as will be described in more detail below.

Figure 4:
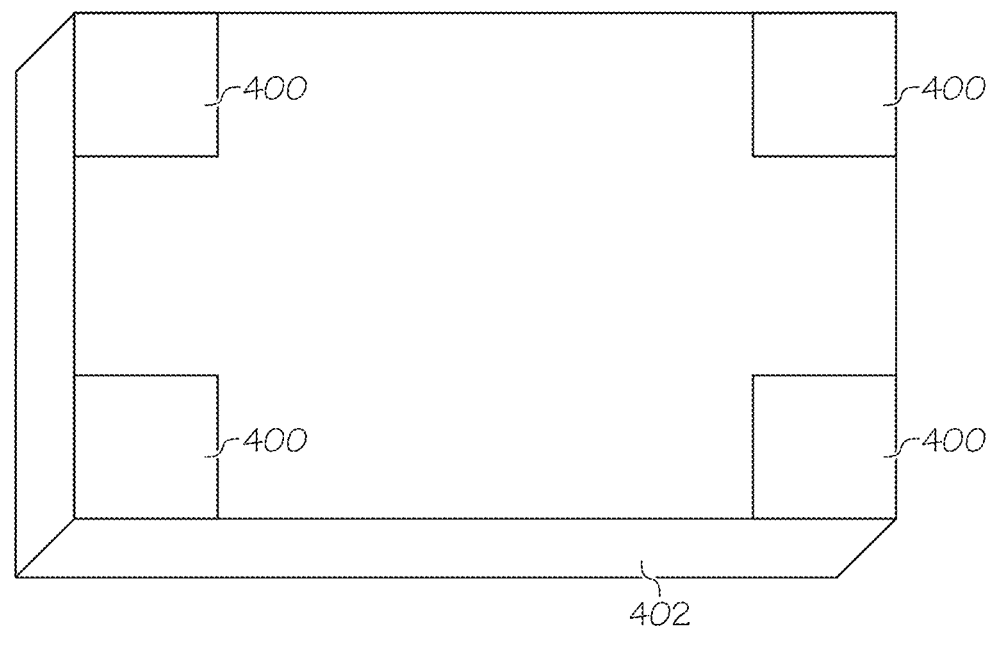
FIG. 4 illustrates four actuator assemblies engaged with a platform, in accordance with another embodiment.

Upon the above construction, such a coupled mechanical device can be deployed in a heavy-lift or power-lift platform, suitable for a full range of military or industrial applications. FIGS. 1A-1H illustrate an example actuator assembly and interaction with a platform. In alternative embodiments, four actuator assemblies may be employed at four corners of a platform, as illustrated in FIG. 4. In a particular embodiment, the coupled device can be deployed in a power-lift platform in which several dual climbing rail guides are provided at each corner (e.g., each of four corners of a platform) with quick change-out interfaces, which enables rapid maintenance/updates with minimal downtime. In the illustrated embodiment of FIG. 1A, the linear actuator 100 employs dual-pinions to climb a dual-sided web of an I-beam with racks on each side.

As illustrated in FIG. 1A, the supporting structure 110 includes a first face 110a, and a second face 110b (not explicitly shown, but see FIG. 1H) opposite the first face 110a. Faces 110a and 110b are opposite sides of the web 110c of support structure 110 (e.g., web of an I-beam). A pair of racks are also included, with a first rack 112a secured to the first face 110a, and a second rack 112b (not shown, but see FIG. 1H) secured to the second face 110b. In the illustrated embodiment, racks 112a and 112b are Part No. KFRD5-1000HJ, as described at https://khkgears.net/pdf/ krf-h krfd-h.pdf, herein incorporated by reference. In particular embodiments, the second rack 112b is identical to the first rack 112a, the second face 110b is identical to the first face 110a, and the coupling between the second rack 112b and second face 110b is identical to the coupling between the first rack 110a and the first face 112a. Thus, racks 112a and 112b are identical but facing opposite one another.

Accordingly, in the illustrated embodiment of FIG. 1A, there is a pair of compound gears 104, 124 engaging the pair of racks 112a and 112b in a rack and pinion-type configuration. The first compound gear 104 includes a first pinion gear 104a engaged with the first rack 112a, and a first input gear 104b that is torsionally locked with the first pinion gear 104a. Likewise, a second compound gear 124 includes a second pinion gear 124a engaged with the second rack 112b, and a second input gear 124b torsionally locked with the second pinion gear 124a. In the illustrated embodiment, the pinion gear and input gear of each compound gear are independent of one another, but torsionally locked to rotate together (e.g., using a pin). However, in alternative embodiments, the pinion gear and input gear of the compound gear may be formed together in a unitary structure, such that they rotate together. In the illustrated embodiment, the compound gears may be Part No. KS5-20 available at https:// khkgears.net/pdf/ks.pdf and incorporated herein by reference.

The linear actuator 100 utilizes a drive gear 114 to move the compound gears 104, 124 to rotate for a transmission of linear motion to compound gears 104 and 124. In certain embodiments, the drive gear 114 is engaged with the first input gear 124b on a first side of the drive gear 114, and engaged with an idle gear 116 on a second side of the drive gear 114, opposite the first side of the drive gear 114. The idle gear 116, also known as a reverse gear, plays a role in redirecting or changing the rotational direction. Herein, such an idle gear 116 is installed to allow the assembly to drive the first and second compound gears simultaneously, to implement a linear motion in one of two opposing directions, so that the pair of racks are propelled to move linearly in a movement direction, consequently implementing the operation of the platform 102. Thus, the idle gear 116 is used to ensure that rotation of each of the pinion gears are synchronized, thus moving the actuator (and therefore the platform) either up or down. The configuration and operation of a similar linear actuator employing an idle gear will be described in more detail with regard to FIG. 1C.

Furthermore, a 48-volt DC motor 118 is provided to output the power for the linear actuator 100. In general, the output of the motor 118 drives an eccentric gearbox 108, which drives the drive gear 114. The drive gear 114 directly contacts teeth of the input gear 124b and the idle gear 116, to force rotation of the input gear 124b and the idle gear 116 in the same rotational directions (e.g., clockwise or counterclockwise). Thus, the drive gear 114 "directly" drives the compound gear 124 such that teeth of the pinion gear 124a engage rack 112b for a linear motion. The idle gear 116 engages the input gear 104b and serves to "reverse" the rotation before applying rotation to input gear 104b, so that input gear 124b and input gear 104b are rotating in opposite directions. Thus, pinion gear 124a and pinion gear 104a engage the teeth of racks 112b and 112a respectively, such that the motion of compound gears 104 and 124 are linear, and simultaneously moving in the same direction (e.g., up or down in an elevator platform configuration).

The configuration of the compound gears and idle gear allow for a compact assembly that can still carry maximum loads under stress and shock environments. For example, the use of a single idle gear to reverse the rotation of the drive gear before the input gear of the second compound gear is engaged, allows a configuration in which each of the compound gears, and the idle gear rotate around axes that are parallel to each other.

In certain embodiment, The output of the drive gear 114 drives both the first pinion gear 124a directly through the drive gear 114 as well as the second pinion gear 104a through the idle gear 116 such that both pinion gears 104a, 124a carry equal load on the rack and transverse in the same rotation direction. As described above, the linear actuator 100 may be rigidly mounted to the underside of the platform 102 and covered in a housing (not shown) to shield each moving part. For operational safety, a clamping brake can optionally be provided as part of the linear actuator assembly. In the illustrated embodiment, the clamping brake 115 is provided inline between the motor 118 and the eccentric gearbox 108, however other configurations are available withing the teachings of this disclosure. An example electric motor suitable for this application is the ME1616 Brushless 20 kW-55 kW Liquid Cooled IPM, manufactured by Motenergy, Inc, Wisconsin, USA, available at https://www.electricmotorsport.com/me 1616-brushless-65 hp-liquid-cooledipm-motor-24-120v.html and incorporated herein by reference. An example clamping brake is the Servo AAB310 or AAB311 series, available at Spring-Set Servo Motor Brakes|Stearns (stearnsbrakes.com), herein incorporated by reference.

As illustrated herein, the linear actuator 100 includes an eccentric gearbox 108, shown as a semi-transparent cylinder in FIG. 1A. The drive gear 114 directly receives the output of the eccentric gearbox 108. In certain embodiments, the eccentric gearbox 108 can be a gearbox equipped with at least an eccentric gearbox to convert rotary motion to the drive gear 114. Herein, the eccentric gearbox 108 is equipped with a 26:1 Mechanical Advantage that greatly reduces the needed electric current to meet operational requirements. This allows for the electric motor to be sized such that it can operate below its continuous duty cycle threshold with plenty of extra power available to operate in off-nominal conditions such as misalignment, shocks, maintenance, and during equipment casualties.

Various types of alternatives to the eccentric gearbox 108 disclosed herein are available for use within the teachings of the present disclosure, for example those disclosed within U.S. Pat. Nos. 9,657,813, 9,879,760, 9,915,319, 10,655,706, 10,801,586, and 11,022,200, each of which is hereby incorporated by reference herein.

Figure 1B:
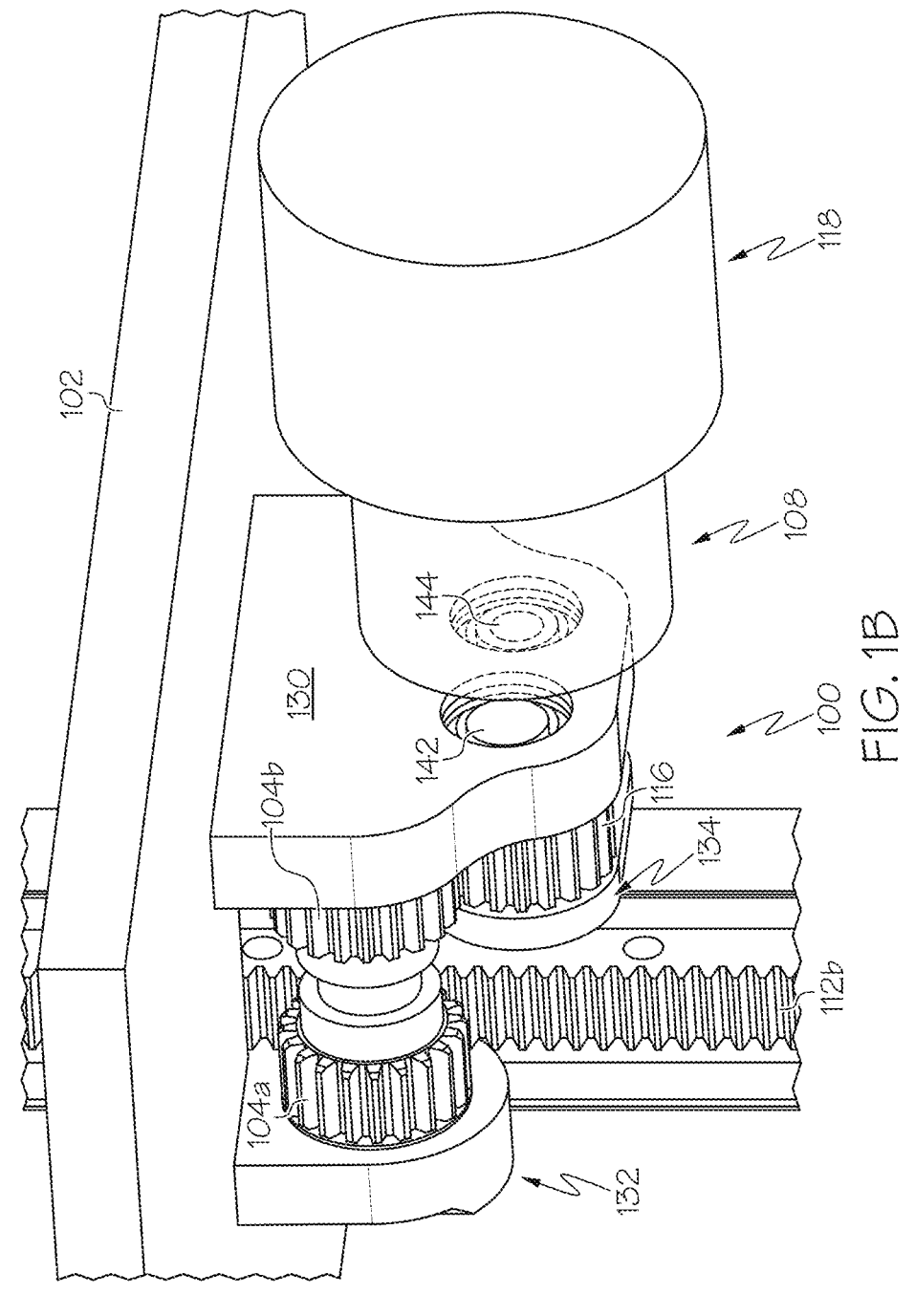
FIG. 1B is an illustration of a linear actuator engaged with a platform via an input bearing block, in accordance with another embodiment.
Figure 1C:
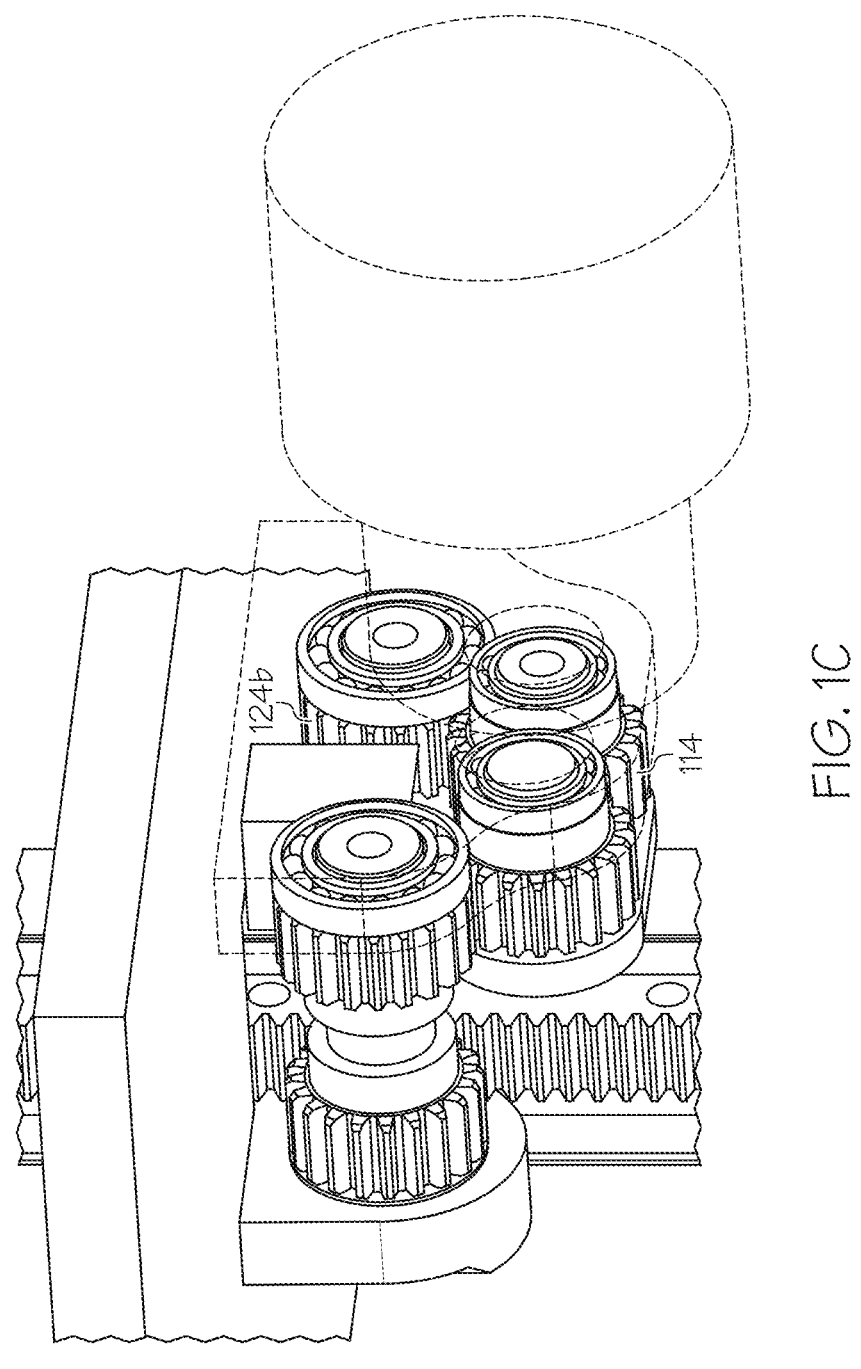
FIG. 1C is an illustration of a linear actuator engaged with a platform via an input bearing block, shown in transparency for view of other components.
Figure 1D:
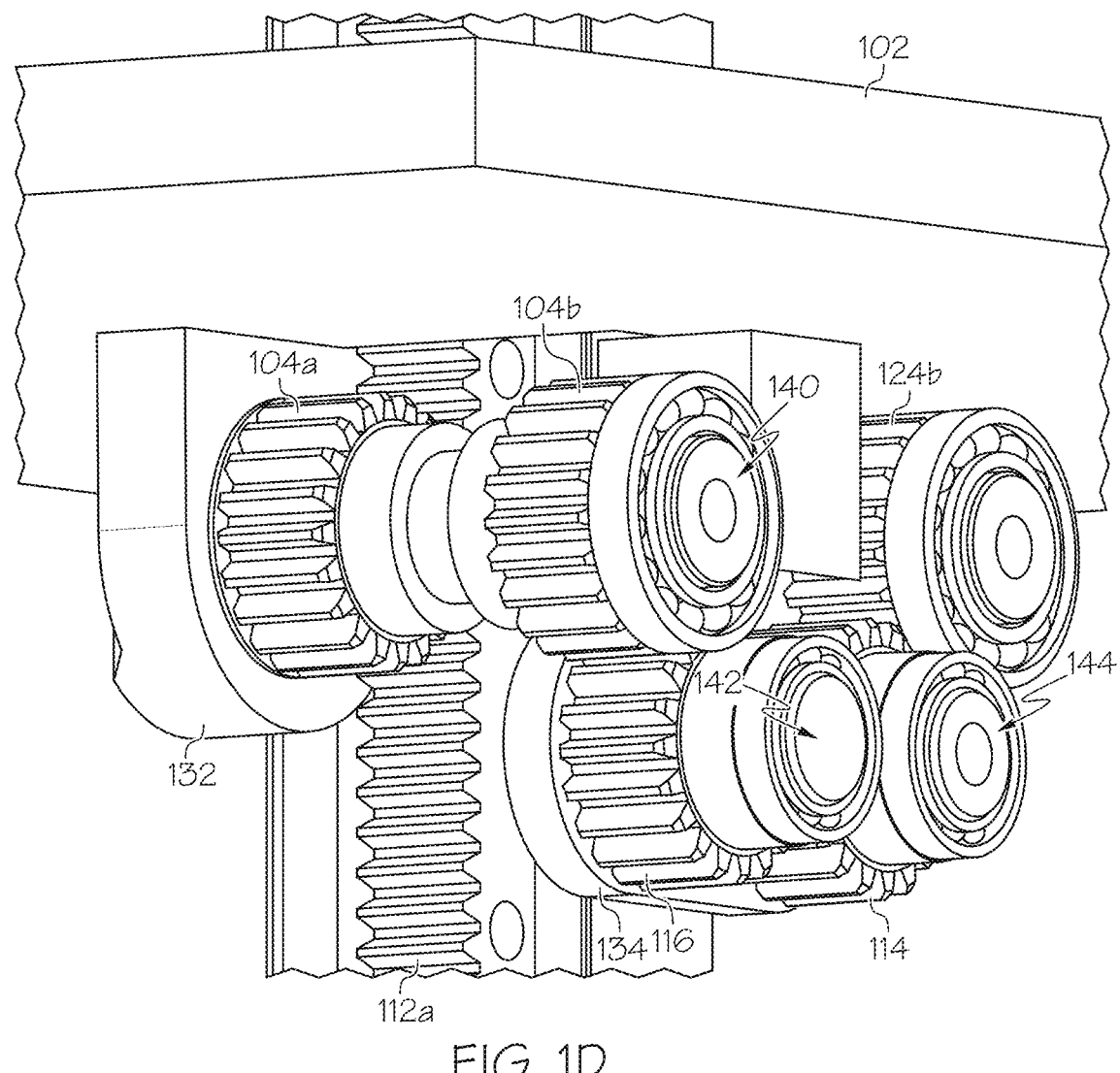
FIG. 1D is a perspective illustration of FIG. 1B with the input bearing block removed for clarity.

FIG. 1B-1D depict an alternative engagement between the linear actuator 100 and the platform 102 via a locking interaction of bearings and bearing blocks. In this embodiment, an input bearing block 130 is installed on the underside of the platform 102. In addition, the input bearing block 130 is engaged with the drive gear 114 via bearing an input gear shaft 144 and with the idle gear 116 via an idle gear shaft 142, respectively. Herein, the input bearing block 130 has bearings and housings through which the input gear shaft 144 and idle gear shaft 142 are positioned to establish a supporting and bearing. The first end of the idle gear shaft 142 is installed in the input bearing block 130. The input bearing block 130 is positioned close to the eccentric gearbox 108 so that a first end of the input gear shaft 144 can receive output of the eccentric gearbox 108 to maintain a rotation, wherein the eccentric gearbox 108 can be driven by the motor 118. On the other hand, a pair of end bearing blocks (a first end bearing block 132 is shown in FIG. 1C, both are shown in FIG. 1H) are mounted on the underside of the platform 102 distal to the eccentric gearbox 108, where the first end bearing block 132 is engaged with the first pinion gear 104a via a first compound gear shaft 140, which is positioned through a bearing hole of the first end bearing block 132. In the illustrated embodiment, an intermediate bearing block 134 is be installed at a second end of the idle gear shaft 142 distal to the input bearing block 130 to bear the idle gear shaft 142.

Similar to the operation described with regard to FIG. 1A, in general, the output of the motor 118 drives the eccentric gearbox 108, which drives the drive gear 114. The drive gear directly contacts teeth of the input gear 124b and the idle gear 116. Thus, the drive gear 116 "directly" drives the compound gear 124 such that teeth of the pinion gear 124a engage rack 112b for linear motion. The idle gear 116 engages the input gear 104b and serves to "reverse" the rotation before applying rotation to input gear 104b, so that input gear 104b and input gear 124b are rotating in opposite directions. Thus, pinion gear 124a and pinion gear 104a engage the teeth of racks 112b and 112a respectively, such that the motion of compound gears 104 and 124 are linear, and simultaneously moving in the same direction (e.g., up or down in an elevator platform configuration).

Figure 1E:
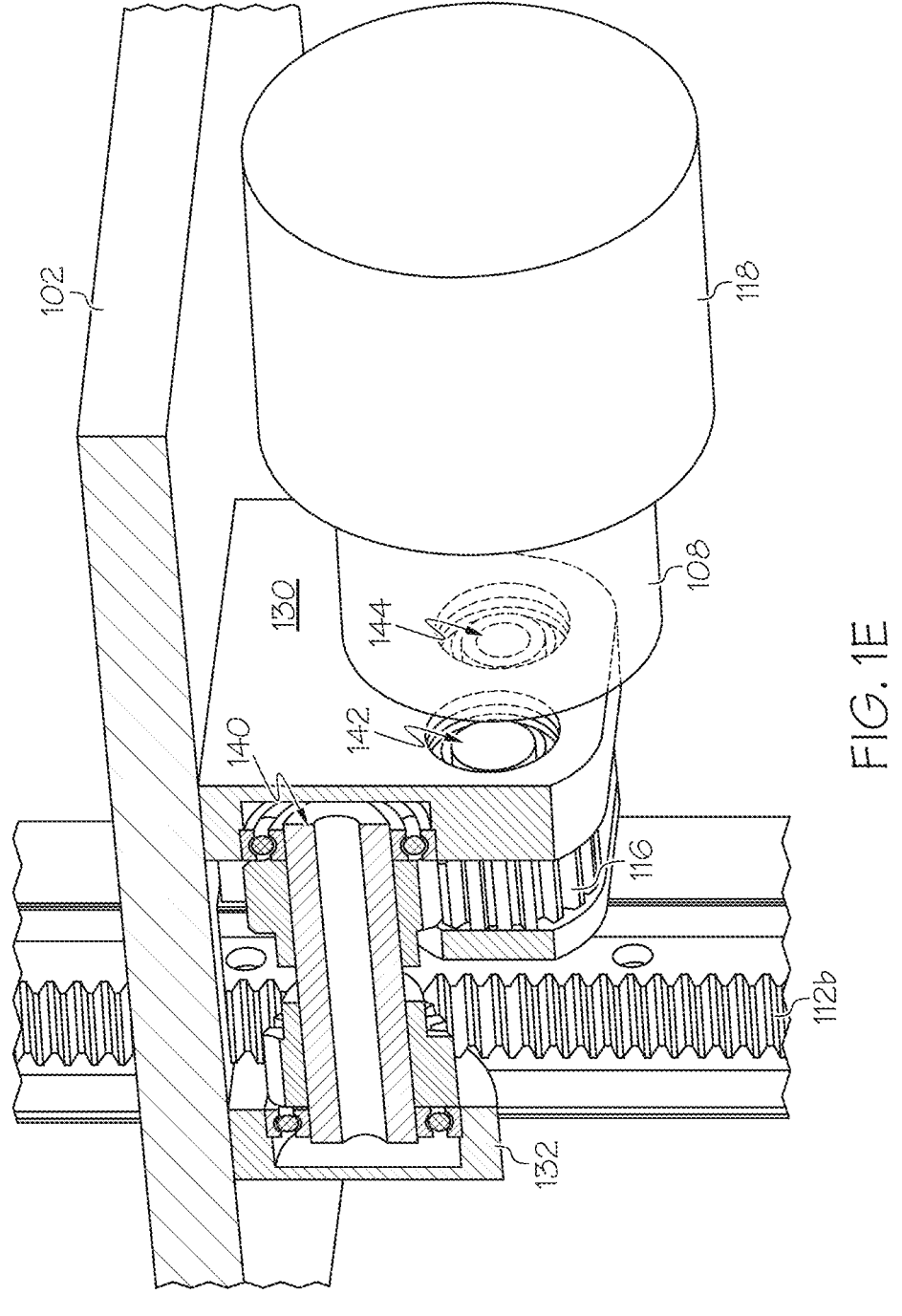
FIG. 1E is an illustration of a cross-sectional view of a compound gear within a linear actuator, in accordance with another embodiment.
Figure 1F:
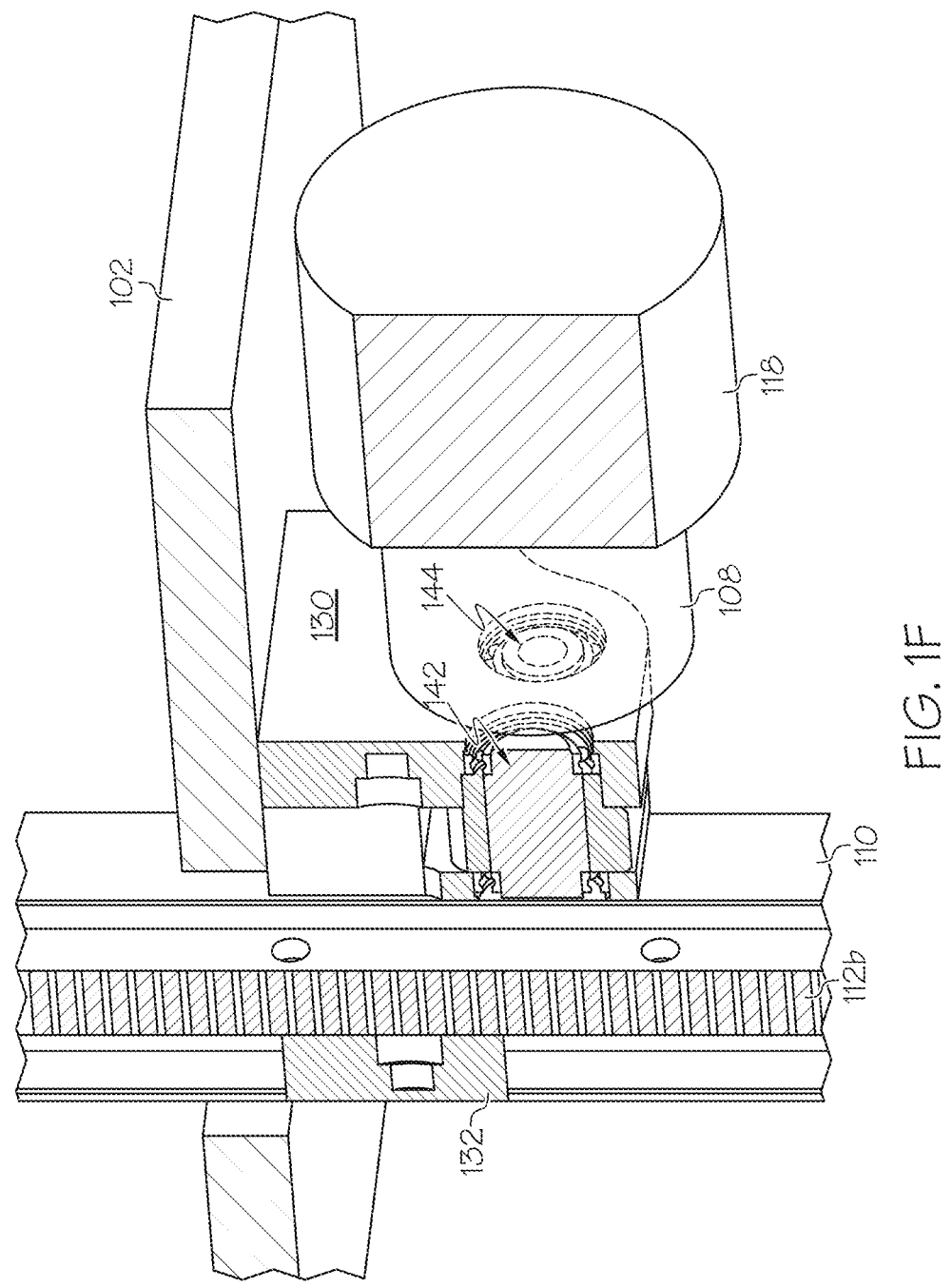
FIG. 1F is an illustration of a cross-sectional view of an idle gear within a linear actuator, in accordance with another embodiment.
Figure 1G:
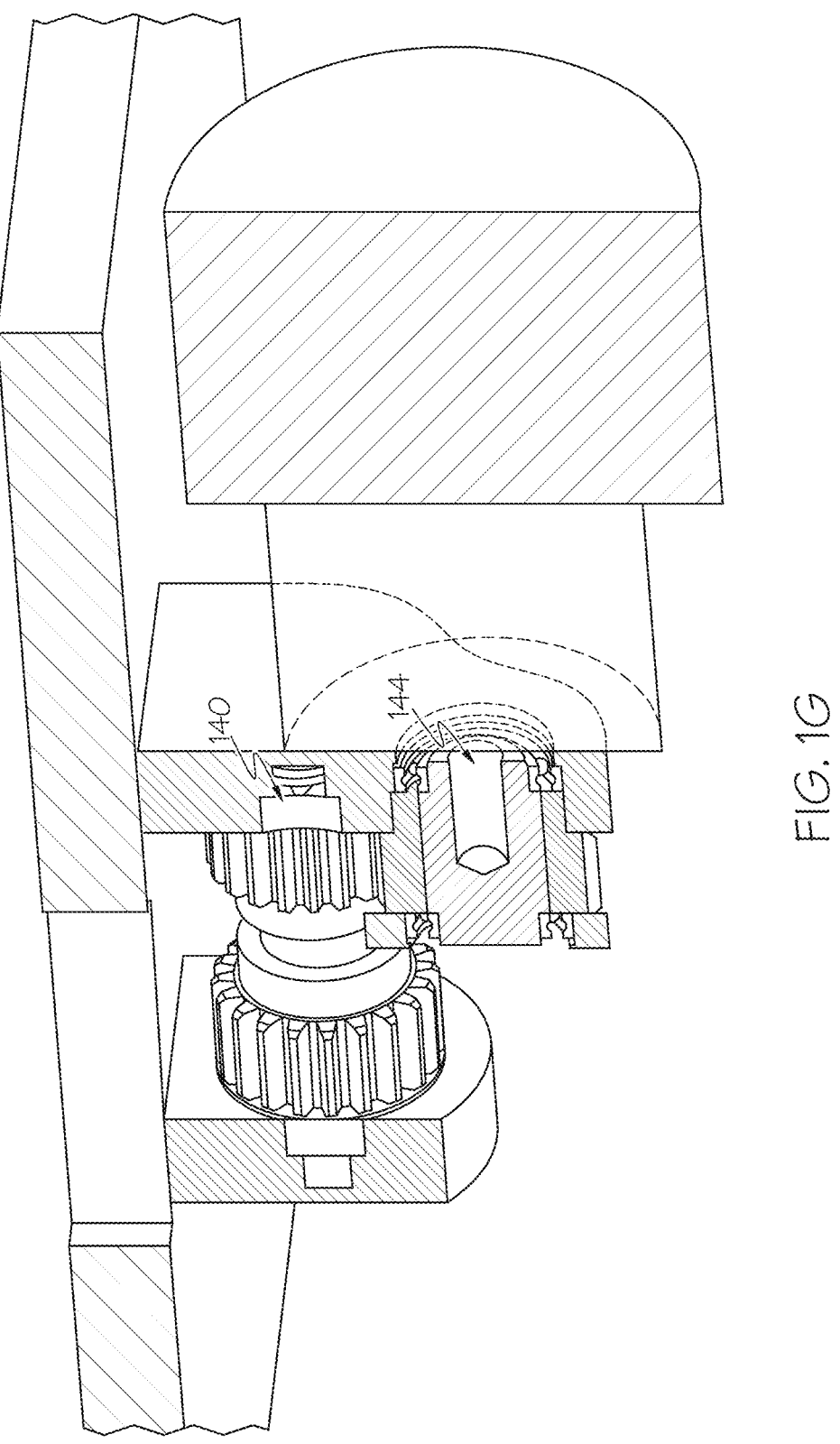
FIG. 1G is an illustration of a cross-sectional view of an input gear within a linear actuator, in accordance with another embodiment.
Figure 1H:
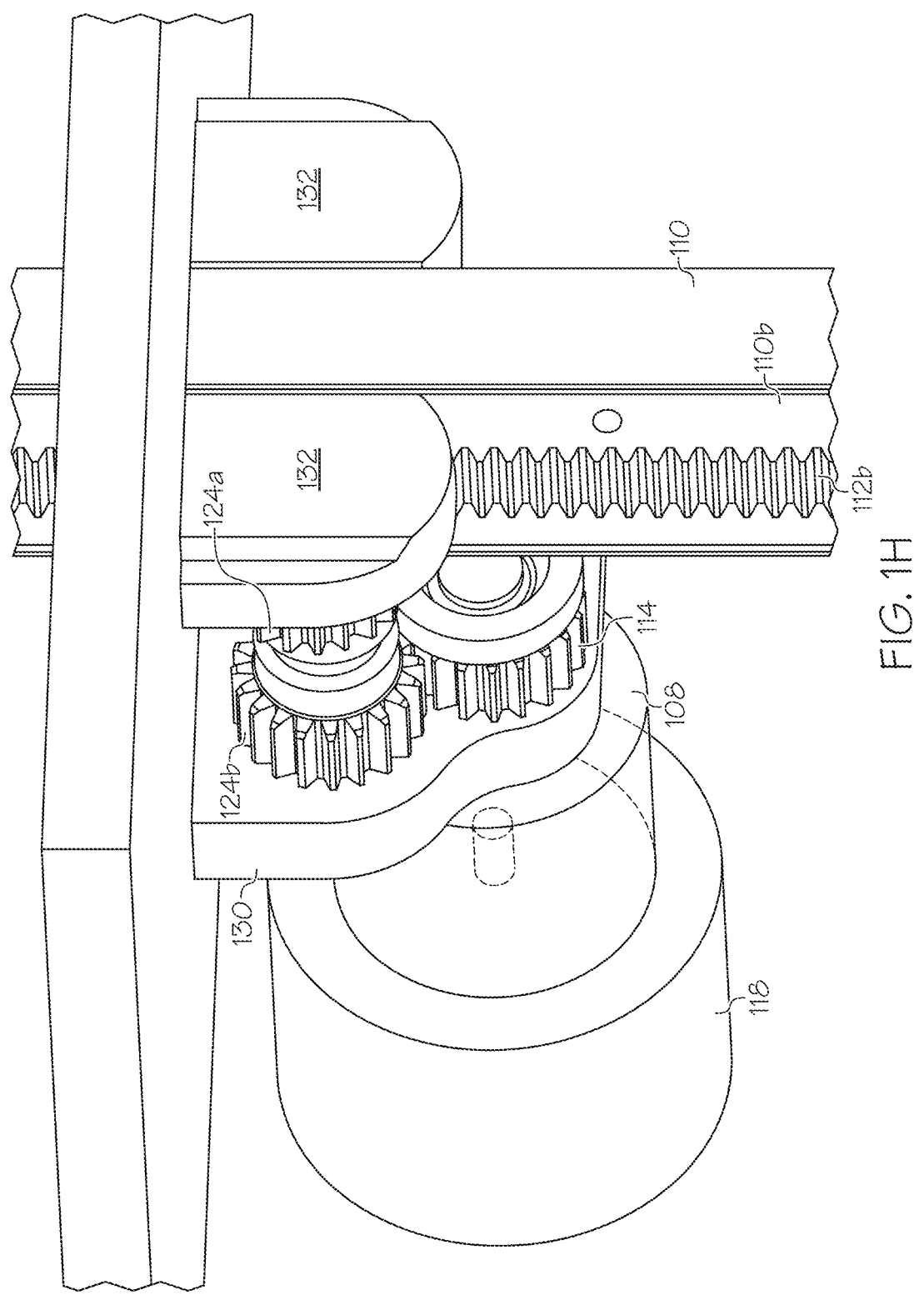
FIG. 1H is an illustration of an actuator assembly of FIG. 1B, from a different perspective.

FIG. 1E-1G depict three sectional illustrations showing the interior for the engaged parts within the linear actuator 100. Illustrated in FIG. 1E, the compound gear shaft 140 is torsionally locked to the compound gears 104 or built as one piece with the compound gear 104. Illustrated in FIG. 1F, the idle gear shaft 142 can be a solid shaft being supported by the input bearing block 130. Illustrated in FIG. 1G, the input gear shaft 144 is configured to include a keyed or splined opening to allow mating to the output of the eccentric gearbox 108. The input gear shaft 144 is locked torsionally to the drive gear 114 or built as one piece with the drive gear 114.

In particular embodiments, the bearing blocks may be formed of aluminum, the supporting structure (e.g., I-beam) may be formed of structural steel, and the platform may be formed of aluminum or steel.

TABLE 1 lists a catalog for parts in the disclosure,

TABLE 1

| list of catalog parts | |
| --- | --- |
| Parts | Catalog |
| Compound Gears | KS5-20 (see https://khkgears.net/pdf/ks.pdf) |
| Rack | KFRD5-1000HJ (see https://khkgears.net/pdf/krf-h krfd-h.pdf) |
| Electric Motor | MS1616 (see https://www.electricmotorsport.com/me1616-brushless-65hp-liquid-cooled-ipm-motor-24-120v.html) |
| Bearings | SKF 212 (see https://www.skf.com/id/products/rolling-bearings/ball-bearings/deep-groove-ball-bearings/productid-212) |
| Bearings | SKF 6010 (see https://www.skf.com/my/products/rolling-bearings/ball-bearings/deep-groove-ball-bearings/productid-6010) |

Figure 2A:
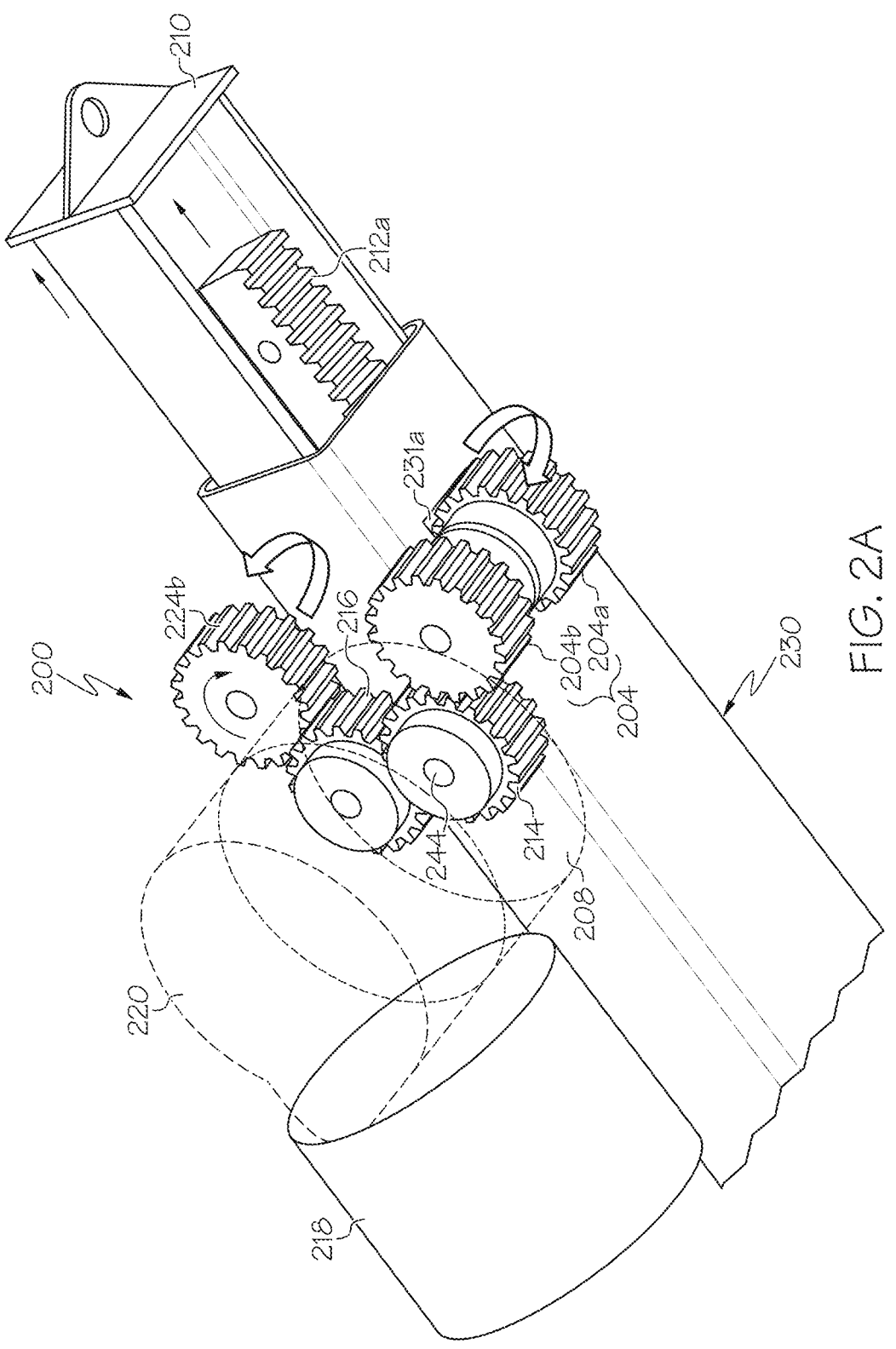
FIG. 2A is an illustration of a linear actuator equipped with a bevel gear in a perspective view, in accordance with another embodiment.

FIG. 2A depicts a perspective view of linear actuator 200 equipped with an eccentric gearbox 208 represented by a semi-transparent cylinder, and a bevel gear 220 represented by another semi-transparent cylinder. In certain embodiments, the bevel gear 220 can be selected from a type of gear with cone-shaped teeth that are used to transmit motion and power between non-parallel shafts, e.g., a straight bevel gear or spiral bevel gear. Such a bevel gear performs a crucial role in transmitting motion and power efficiently between shafts with varying angles. In particular embodiments, the choice between straight or spiral bevel gears depends on the specific requirements of the application, including load, speed, and noise considerations. Furthermore, the motor 218 in this example embodiment is positioned in a 90-degree offset configuration using the bevel gear 220 (another semi-transparent volume in FIG. 2A-2B) to make the device more compact. Furthermore, a safety housing can be utilized to cover the exposed gears (not shown).

Also referring to FIG. 2A, the linear actuator 200 is coupled with a hollow structure, e.g., a tube 230. The tube 230 is engaged with the first and second compound gears 204 (including pinion gear 204a and input gear 204b), and 224 (including pinion gear 224a (not shown) and input gear 224b), the idle gear 216, and the drive gear 214. The tube 230 includes first and second openings 231a and 231b (not shown) through which the first and second pinion gears 204a, 224a engage the first and second racks 212a and 212b (212b not shown) of the dual of racks, respectively. Pinion gear 224a is identical to pinion gear 204a, but located on the opposite face of the web of structure 210 (e.g., I-beam), and opening 231b is identical to opening 231a, but located on the opposite face of tube 230 to allow pinion gear 224a to engage rack 212b. Similarly, the tube 230 can be fixed with the actuator 100 via a mount of brackets or bearing blocks on the surface of the tube 230 in a similar manner to the manner in which actuator 100 is secured to platform 102 in embodiments described above. Accordingly, the tube 230 is configured to move stimulatingly in an opposite direction to the movement of racks 212a and 212b. Such a linear actuator depicted in FIG. 2A-2B is an efficient and reliable replacement for a traditional hydraulic cylinder.

In the illustrated embodiment, movement of the dual of racks and rotation of the dual input gears can be implemented as follows below. When power is switched on, the motor 218 drives the eccentric gearbox 208 (optionally driven through the bevel gear 220, or not) to output a rotation via the input gear shaft 244 to the drive gear 214, in a rotational direction. Then, the drive gear 214 drives the idle gear 216 to rotate simultaneously in an opposite rotational direction. Upon the rotation in two opposite rotations, the drive gear 214 and the idle gear 216 drive compound gears 204, 224 respectively (through input gears 204b and 224b, respectively), wherein the drive gear 214 drives the first input gear 204b, and the idle gear 216 drives the second input gear 224b, in two opposite rotations. Accordingly, driven by their input gears respectively, the first pinion gear 204a and the second pinion gear 224a rotate in two opposite directions, propelling the dual of racks to move in a single direction relative to the actuator assembly, consequently securing a linear movement of the platform or tube, even in a response to shocks. The reduction in the number of parts compared to traditional eccentric reducers allows the tailoring of strength and reliability properties depending on application with a focus on high torque industrial applications.

In certain embodiment, the eccentric gearbox 208 can be an eccentric gearbox allowing a high volumetric torque density. A typical eccentric gearbox can be selected from a SPE (Simplified Parallel Eccentric) gearbox equipped with a rotary actuator, for example, described in U.S. Pat. No. 11,022,200, the teachings of which are incorporated herein by reference. However, a skilled person in the art would recognize the examples in those references should not impose any limitation to the structure or configurations of the disclosed linear actuators presented in the Figures or description herein.

Figure 3A:
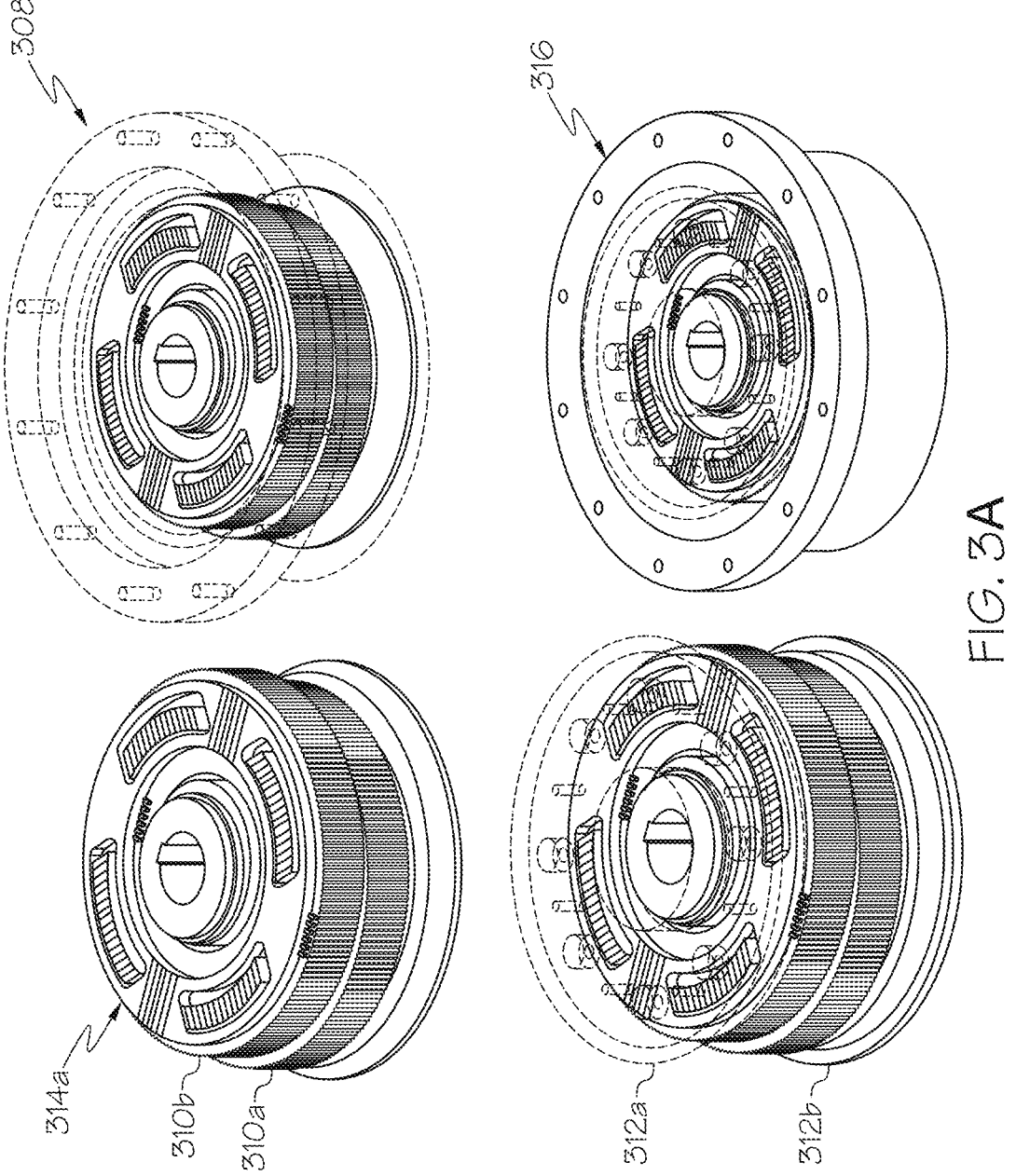
FIGS. 3A and 3B illustration an eccentric gear assembly, in accordance with another embodiment.
Figure 3B:
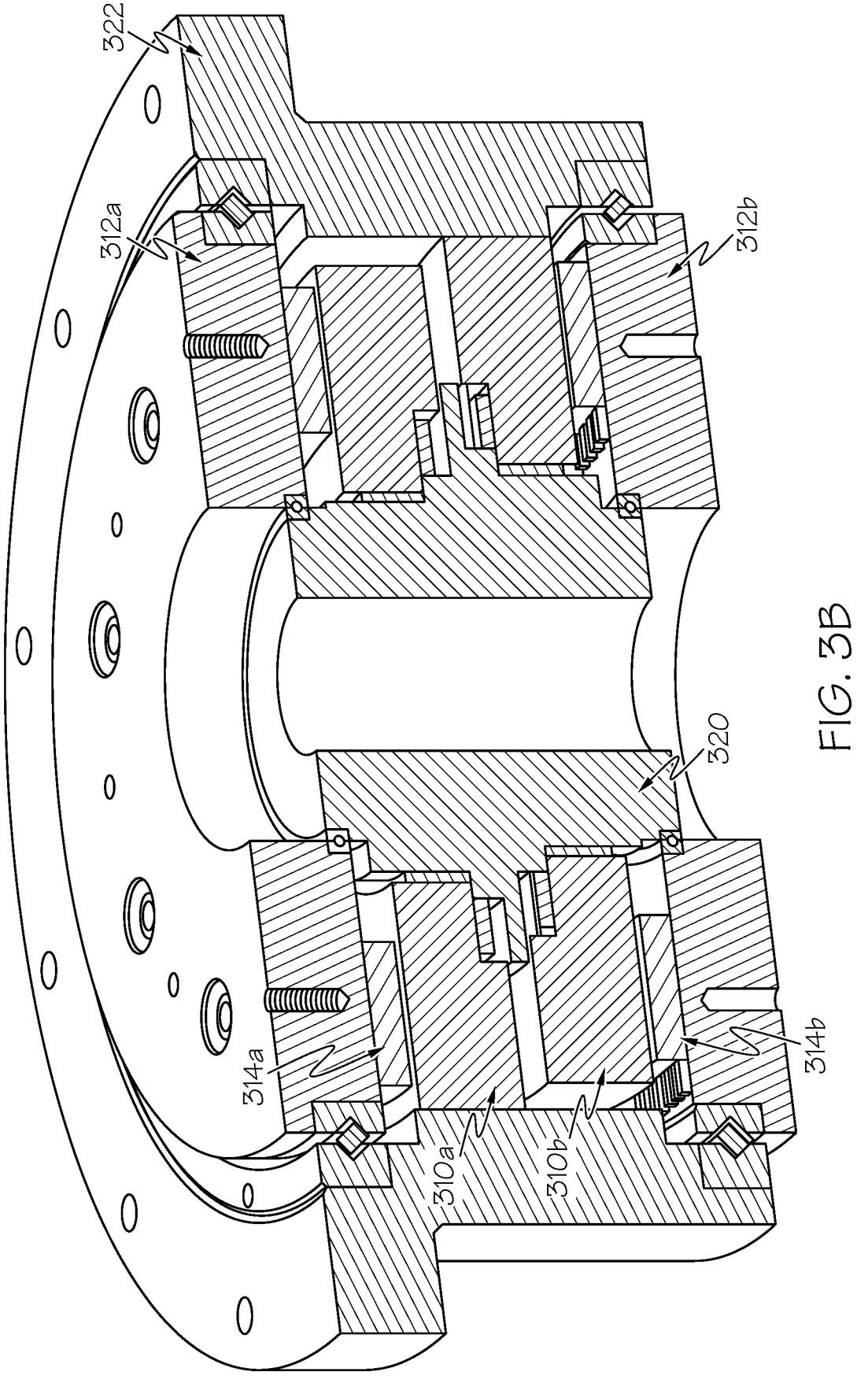

The eccentric gearboxes disclosed herein (108 and 208) incorporate at least a pair of eccentric gears having spur teeth instead of cycloidal discs, which increases load capacity and durability in transmitting motion. An example is provided in FIGS. 3A and 3B, including eccentric gears 310a and 310b. In addition, the eccentric gearbox 308, for example, includes an outer housing covering stacked eccentric gears 310a and 310b, more than one output housings covering the output, output stators 312a and 312b with crosslinks 314a and 314b. Internally, the eccentric gearbox 308 can include a central eccentric drive shaft 320 having cam features that drive the two internal gears around in engagement with the outer gear 316. The eccentric gears are 180° out of phase. The bottom gear can be engaged in the left side of one of output gears, and the top gear can be engaged in the right side of the output gear 322. These eccentric gears within the eccentric gearbox 108 move around in a circular motion but do not rotate. In addition, dual mesh (180° out of phase) for the two parallel eccentric gears driven by the central eccentric shaft with virtually no load (less than 20% of the gear teeth force) on the crankshaft bearings ensures long life for the eccentric gearbox 308. These two meshes represent up to 12 teeth in mesh to have very low sliding velocities (low wear) and virtually no lost motion (or backlash). The large size of the eccentric gears and the 180° out of phase nature of the dual mesh also makes this gear train very resilient to shock. The above features secure that precision motor rotation sensors can accurately represent the climbing motion at each of the four corners to prevent any destructive platform tilting due to uneven platform loading.

FIG. 4 illustrates another embodiment of the present disclosure, in which four linear actuators 400 of the type described above are installed at four corners of a platform 402, for raising and/or lowering significant loads. In particular embodiments, the motors, gears and actuators are sized to allow functionality using only two of the four actuators, to allow for use during repair or maintenance. For example, each actuator 400 may be configured to allow for it to handle loads twice as large as expected in a four-actuator design, in case only two actuators are available at a given time.

In certain embodiments, the eccentric gearbox 108, 208 or 308 of the present disclosure may be built using involute gearing components, alternatively. An alternate may be a Modified Parallel Eccentric (MPE), also referred to as the Dual Parallel Eccentric (DPE), for example described in U.S. Pat. No. 10,655,706, which is hereby incorporated herein by reference.

In particular embodiments, the MPE/DPE design can use three cammed drive shafts to move the two eccentric internal gears. For example, the MPE design can create significant loading on the bearings for each of those three drive shafts. Notably, the maturation from MPE to the SPE is the introduction of crosslinks to transfer that torque directly into the rigid stators to improve geartrain life, but the overall structure of the gearbox is the same.

The linear actuator in this disclosure provides advantages including securing a significant mechanical advantage of 26:1, reducing the required electric current and allowing for the electric motor to operate comfortably below its continuous duty cycle threshold. In addition, this ensures extra power availability for off-nominal conditions like misalignment, shocks, maintenance, and equipment casualties. The actuator in the disclosure, with dual pinions clamping onto both sides of the racked column (e.g., I beam), is inherently resilient to shocks, transferring loads through involute gearing onto a rack. The linear actuator, adapted to be sized for inherent redundancy, can be powered by a commercially available motor and operate even with the loss of one corner actuator. The actuator's reliability is supported and enabled by well-known technologies like involute gearing, and its maintainability is enhanced by using a 48 VDC power source, reducing high-voltage hazards. The simplicity, reliability, and modular design presented by the above disclosure make it cost-effective, easier to maintain, and suitable for even warfighting military operations.

The present disclosure also provides configuration management for uneven load distributions and partial failures. As a result, a hatch employing a linear actuator as disclosed herein can be closed on demand and a powered platform employing a linear actuator as disclosed herein can be raised and lowered even under high shock loads. For the platform use case a further benefit is that no upper stage heavy machinery room is necessary to support this unique design. The novel electric actuator designs contemplated herein can replace systems and have three to four orders better performance than that of present commercial actuator practice.

Although the linear actuator of the present disclosure is disclosed in the context of powered platforms, it also is suitable for a full range of military applications (e.g., for Army platforms, aircraft, missiles, aircraft carriers, submarines, etc.) and non-military, commercial applications (e.g., electric open architecture cars, buses, trucks, mining systems, surgery, construction systems, etc.). Indeed, the applications of moving a heavy-lift platform or providing linear actuation have wide applicability beyond the DoD (Defense of Department) use-case disclosed here. For example, a similar structure for a smaller set of actuators for defense/offense missiles could also be given serious consideration. It also may be adapted for industrial applications directly in line with the DoD use case, as it provides significant opportunities to be a direct replacement for most hydraulic actuators.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims. It will also be appreciated that the various features set forth in the claims may be presented in various combinations and sub-combinations in future claims without departing from the scope of the invention. In particular, the present disclosure expressly contemplates any such combination or sub-combination that is not known to the prior art, as if such combinations or sub-combinations were expressly written out.

What is claimed is:

1. An actuator assembly, comprising:
a support structure having a first face, and a second face opposite the first face;
a first rack secured to the first face;
a second rack secured to the second face;
a first compound gear including a first pinion gear engaged with the first rack, and a first input gear torsionally locked with the first pinion gear;
a second compound gear including a second pinion gear engaged with the second rack, and a second input gear torsionally locked with the second pinion gear; and
a drive gear engaged by contact with the first input gear on a first side of the drive gear, and engaged with an idle gear on a second side of the drive gear, opposite the first side of the drive gear;
wherein the first and second compound gears are coupled for simultaneous linear motion in one of two opposing directions.

2. The actuator assembly of claim 1, wherein the drive gear is configured to directly receive an output of an eccentric gearbox.

3. The actuator assembly of claim 2, further comprising the eccentric gearbox, and wherein the eccentric gearbox is coupled with the drive gear.

4. The actuator assembly of claim 3, further comprising a shaft extending from the eccentric gearbox is torsionally locked with the drive gear.

5. The actuator assembly of claim 4, wherein the first and second compound gears are coupled with a platform for carrying loads in the one of the two opposing directions.

6. The actuator assembly of claim 5, wherein the coupling between the platform and the first compound gear is formed between the first input gear and the first pinion gear.

7. The actuator assembly of claim 6, wherein the coupling between the platform and the second compound gear is formed between the second gear and the second pinion gear.

8. The actuator assembly of claim 3, further comprising a motor configured to induce a transmission of the eccentric drive to the drive gear.

9. The actuator assembly of claim 8, further comprising a bevel gear, wherein a first side of the bevel gear is engaged with the motor, and a second side of the bevel gear is engaged with the eccentric gearbox.

10. The actuator assembly of claim 9, wherein the motor is configured to have a 90-degree offset to the bevel gear.

11. The actuator assembly of claim 3, wherein the eccentric gearbox includes at least a pair of eccentric gears having spur teeth.

12. The actuator assembly of claim 2, further comprising an input bearing block configured to bear the drive gear via an input gear shaft.

13. The actuator assembly of claim 12, wherein the input bearing block is configured to further bear the idle gear at a first end of an idle gear shaft.

14. The actuator assembly of claim 1, further comprising end bearing blocks configured to bear the first and second pinion gears.

15. The actuator assembly of claim 14, further comprising at least an intermediate bearing block to bear the idle gear at a second end of an idle gear shaft.

16. The actuator assembly of claim 1, further comprising a hollow structure coupled with the first and second compound gears, the idle gear, and the drive gear, the hollow structure including first and second openings through which the first and second pinion gears engage the first and second racks, respectively.

17. The actuator assembly of claim 16, wherein the hollow structure comprises tube steel, and the first and second openings are located on opposite faces of the hollow structure.

18. The actuator of claim 17, wherein the support structure comprises an I-beam, and the first and second racks are installed at opposite faces of a web of the I-beam.

19. The actuator assembly of claim 1, wherein the drive gear comprises a single gear that simultaneously meshes with teeth of the first input gear and teeth of the idle gear.

* * * * *